United States Patent

Kerko et al.

Patent Number: 5,256,607
Date of Patent: Oct. 26, 1993

[54] NEUTRAL, ULTRAVIOLET ABSORING, FIXED TINT LENSES

[75] Inventors: David J. Kerko; David W. Morgan, both of Corning, N.Y.

[73] Assignee: Corning Incorporated, Corning, N.Y.

[21] Appl. No.: 982,561

[22] Filed: Nov. 27, 1992

[51] Int. Cl.$^5$ .......... C03C 3/089; C03C 4/08
[52] U.S. Cl. .......... 501/65; 501/66; 501/67; 501/71; 501/905
[58] Field of Search .......... 501/65, 66, 67, 905, 501/71

[56] References Cited

U.S. PATENT DOCUMENTS 2,688,561 9/1954 Armistead.
3,010,836 11/1961 Upton et al.
3,790,260 2/1974 Boyd et al.
4,565,791 1/1986 Boudot et al.
4,768,859 9/1988 Kasori et al.
4,824,806 4/1989 Yokoi et al.

Primary Examiner—Karl Group
Attorney, Agent, or Firm—Clinton S. Janes, Jr.

[57] ABSTRACT

A transparent glass which, at a thickness of 2 mm, does not transmit more than about 1% of ultraviolet radiation at a wavelength of 380 nm and exhibits a neutral gray, fixed tint bounded by apices A, B, C, D, A of the drawing, a purity no higher than 6, and a luminous transmittance between 10–16, said glass having a composition consisting essentially, expressed in terms of weight percent on the oxide basis, of

| | | | |
|---|---|---|---|
| $SiO_2$ | 65–72 | CaO | 0–1.5 |
| $B_2O_3$ | 2–6 | $Al_2O_3$ + CaO | 0.2–2.25 |
| $Na_2O$ | 6–10 | $As_2O_3$ | 0–0.3 |
| $K_2O$ | 10–16 | $Fe_2O_3$ | 4.8–6.2 |
| $Na_2O + K_2O$ | 17–23 | $Co_3O_4$ | 0.012–0.02 |
| $K_2O:Na_2O$ | 1.25–2.25 | NiO | 0.16–0.21 |
| $Al_2O_3$ | 0–2.25 | ZnO | 0–1.5 |

3 Claims, 1 Drawing Sheet

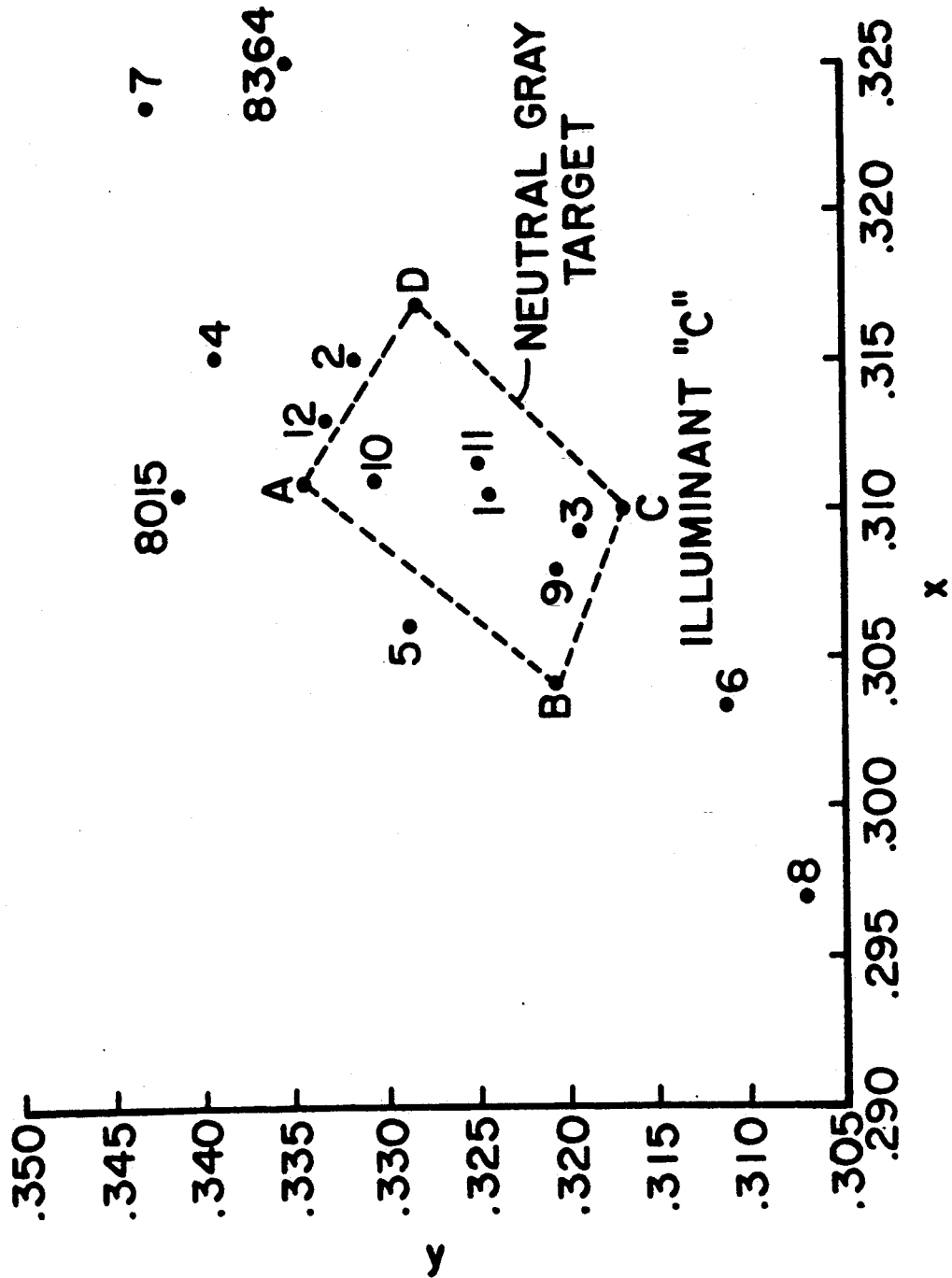

NEUTRAL, ULTRAVIOLET ABSORBING, FIXED TINT LENSES

RELATED APPLICATION

U.S. application Ser. No. 07/982,562, filed concurrently herewith in the names of D. J. Kerko, J. C. Lapp, and D. W. Morgan under the title FAST STRENGTHENING GLASS LENSES, discloses the production of ophthalmic lenses having compositions preferably devoid of ZnO which can be chemically strengthened to high values with surface compression layers of significant depths via treatments not exceeding four hours, and preferably no more than two hours. The glass compositions were further designed to limit the transmittance of ultraviolet radiation at 3800 Å (380 nm) to no more than 1% at a thickness of 2 mm through the incorporation of iron oxide. Finally, to obtain a particularly desired neutral gray coloration therein, cobalt oxide and nickel oxide were also included. The base glass compositions for those lenses consisted essentially, expressed in terms of weight percent on the oxide basis, of

| | | | |
|---|---|---|---|
| $SiO_2$ | 55-65 | CaO | 0-1.5 |
| $B_2O_3$ | 5-20 | MgO | 0-4 |
| $Al_2O_3$ | 4-10 | $TiO_2$ | 0-4 |
| $B_2O_3 + Al_2O_3$ | 14-26 | $ZrO_2$ | 0-7 |
| $Li_2O$ | 0-3 | $MgO + TiO_2 + ZrO_2$ | 0-10 |
| $Na_2O$ | 6-18 | $As_2O_3$ | 0-0.5 |
| $K_2O$ | 2-10 | ZnO | 0-1.5 |
| $Li_2O + Na_2O + K_2O$ | 13-22. | | |

Iron oxide in amounts of 3.5-5.5%, expressed in terms of $Fe_2O_3$, limited the transmittance of ultraviolet radiation at 380 nm to no more than 1% at glass cross sections of 2 mm. To achieve a desired neutral gray coloration, cobalt oxide in amounts of 0.02-0.035%, expressed in terms of $Co_3O_4$, and nickel oxide in concentrations of 0.08-0.2%, expressed in terms of NiO, were added.

BACKGROUND OF THE INVENTION

Neutral gray, fixed tint sunglasses have been marketed for may years. Bausch and Lomb, Rochester, N.Y. has marketed a glass G15 since the 1940s and Corning Incorporated, Corning, N.Y. has marketed Code 8364, included within U.S. Pat. No. 2,688,561 (Armistead), since the 1950s. Corning has also manufactured a glass having a composition similar to that of G-15 under Code 8015. Analyses of 8015 and 8364, reported in terms of weight percent on the oxide basis, are recorded below.

| | 8015 | 8364 |
|---|---|---|
| $SiO_2$ | 68.41 | 65.4 |
| $Al_2O_3$ | 0.51 | 2.0 |
| $Na_2O$ | 8.81 | 7.25 |
| $K_2O$ | 9.71 | 10.6 |
| ZnO | 6.76 | 13.52 |
| $Fe_2O_3$ | 5.54 | 1.7 |
| $Co_3O_4$ | 0.021 | — |
| NiO | 0.126 | 0.21 |
| $As_2O_3$ | 0.111 | — |
| $TiO_2$ | — | 0.3 |

Both of those glasses appear neutral gray to the eye when viewed alone. When they are examined side-by-side, however, Code 8015 glass appears greenish gay compared to Code 8364 glass. On the other hand, Code 8364 glass assumes a brownish gray hue when viewed next to a glass of a more neutral gray; i.e., a glass having a chromaticity closer to the illuminant.

As can be readily appreciated, the closer the tint of a glass approaches the neutral gray of the illuminant, the better each color retains its relationship with the other colors of the spectrum. Stated in another way, the color balance is maintained; e.g., the sky exhibits a truer blue hue, not bluish green as viewed through glass Code 8015.

Accordingly, the first vital objective of the present invention was to develop a glass suitable for use as a sunglass exhibiting a fixed tint gray coloration which closely approaches the illuminant, and which limits the transmittance of ultraviolet radiation at a wavelength of 380 nm to no more than 1%.

As was observed in Ser. No. 07/982,562, the optical and ophthalmic laboratories have been under increasing pressure to reduce the level of zinc released in the effluent flowing from their finishing operations. Therefore, the second vital objective of the instant invention was to design glass compositions for use as sunglasses displaying the desired neutral gray tint and limitation of ultraviolet radiation transmission, and which would have a very low level of zinc; preferably no substantial quantity of zinc is purposefully added to the compositions.

Also, as was explained in Ser. No. 07/982,562, the presence of CaO in a glass composition appears to block or otherwise restrict an ion exchange reaction taking place between K+ and Na+ ions. As a result, the surface compression layer developed during the ion exchange reaction is quite shallow such that, whereas it imparts a very sizeable immediate improvement in mechanical strength, the glass is subject to a significant decrease in strength when exposed to surface abuse commonly encountered in everyday use. Consequently, it has been considered most desirable to avoid any substantial concentration of CaO in glasses which are scheduled to be chemically strengthened and, hence, a subsidiary objective of the subject invention was to devise a range of preferred glasses satisfying the above objectives wherein the compositions thereof contain CaO in very low amounts and can be essentially free from CaO.

SUMMARY OF THE INVENTION

The two vital objectives of the invention can be attained in base glass compositions consisting essentially, expressed in terms of weight percent on the oxide basis, of

| | | | |
|---|---|---|---|
| $SiO_2$ | 65-72 | CaO | 0-1.5 |
| $B_2O_3$ | 2-6 | $Al_2O_3 + CaO$ | 0.2-2.25 |
| $Na_2O$ | 6-10 | $As_2O_3$ | 0-0.3 |
| $K_2O$ | 10-16 | $Fe_2O_3$ | 4.8-6.2 |
| $Na_2O + K_2O$ | 17-23 | $Co_3O_4$ | 0.012-0.02 |
| $K_2O:Na_2O$ | 1.25-2.25 | NiO | 0.16-0.21 |
| $Al_2O_3$ | 0-2.25 | ZnO | 0-1.5. |

$As_2O_3$ is present to perform its customary function as a fining agent. Other compatible metal oxides useful in modifying the melting and forming characteristics of the glass or the physical properties thereof, e.g., the refractive index thereof, such as BaO, MgO, $La_2O_3$, $Nb_2O_5$, $TiO_2$, and $ZrO_2$, may be included in minor amounts, preferably no more than 3% in individual amounts, the total of all extraneous additions not exceeding 5% by weight.

The weight ratio $K_2O:Na_2O$ must be at least 1.25 in order to secure the strong green absorption needed from the inclusion of NiO which, in turn, engenders a purple coloration. $Al_2O_3$ and alkaline earth metal oxides will be maintained at relatively low concentrations inasmuch as they tend to move the chromaticity of the glass away from the illuminant.

As observed above, to assure rapid and long lasting strengthening effects, the concentrations of CaO will be held at low levels, preferably not in excess of 1%.

The high level of iron, expressed in terms of $Fe_2O_3$, is necessary to achieve the desired absorption of ultraviolet radiation at a wavelength of 380 nm of no more than 1%. When sufficient iron has been incorporated into the glass to obtain the desired absorption, cobalt and nickel are added to adjust the chromaticity to a neutral target. Thus, increasing the iron content causes a substantial shift to higher values of y with a smaller change in the value of x. Additions of cobalt move the chromaticity in the reverse direction. Additions of nickel move the chromaticity to lower values of y with little change in x.

Inclusions of aluminum, calcium, and/or boron, expressed in terms of $Al_2O_3$, CaO and $B_2O_3$, are required to suppress the transmittance at a wavelength of 380 nm below 1%. The addition of $Al_2O_3$ generally tends to shift the chromaticity of the glass toward the yellow, i.e., a lower blue component, and increases the luminous transmittance Y slightly. The addition of CaO has a profound effect upon the chromaticity of the glass, causing a shift thereof in the same general direction as additions of iron. In like manner to $Al_2O_3$, the addition of CaO increases the luminous transmittance of the glass slightly. The inclusion of $B_2O_3$ also shifts the chromaticity of the glass in like manner to iron, i.e., away from the blue component, but, contrary to $Al_2O_3$ and CaO, decreases the luminous transmittance somewhat. Overall, $Al_2O_3$ and alkaline earth metal oxides will be held at low levels inasmuch as they tend to move the chromaticity of the glass away from the illuminant. Nevertheless, a small amount is required to assure maintenance of the transmittance of the glass at a wavelength of 380 nm at no greater than 1%. Although CaO exerts an adverse effect upon chemical strengthening of the glass, its presence in the glass composition is useful to not only suppress the transmittance thereof at 380 nm, but also to adjust the refractive index.

As was observed above, the preferred glasses will be essentially free of ZnO and, where the glasses are to be subjected to chemical strengthening, CaO will be essentially absent from the composition.

BRIEF DESCRIPTION OF THE DRAWING

The appended drawing comprises a plot of chromaticity coordinates on a color mixture diagram utilizing Illuminant C.

PRIOR ART

In addition to Ser. No. 07/982,562 and U.S. Pat. No. 2,688,561 discussed above, the following patents are believed to be of interest:

U.S. Pat. No. 3,010,836 (Upton et al.) discloses glasses especially designed for use in sunglasses which, at a thickness of 2 mm, will transmit 0% ultraviolet radiation at wavelengths of 370 nm and below and exhibit a neutral gray appearance. Those glasses consisted essentially, in weight percent, of

| $SiO_2$ | 52-62 | $Al_2O_3$ | 0-3 | $Na_2O$ | 0-8 |
|---|---|---|---|---|---|
| $K_2O$ | 10-15 | $ZrO_2$ | 0-7 | $Li_2O$ | 0-4 |
| $B_2O_3$ | 15-20 | FeO | 1-4 | MgO | 0-1 |
| ZnO | 1-9. | | | | |

FeO comprised the sole colorant; ZnO is a mandated ingredient; the $SiO_2$ level is too low; and the $B_2O_3$ concentration too high.

U.S. Pat. No. 3,790,260 (Boyd et al.) describes ophthalmic lenses composed of glasses yielding very high mechanical strengths when subjected to chemical strengthening, those glasses consisting essentially, in weight percent, of

| $Na_2O$ | 3-15 | MgO | 0-15 | $Al_2O_3$ | 1-5 |
|---|---|---|---|---|---|
| $K_2O$ | 3-15 | ZnO + MgO | 8-20 | $ZrO_2$ | 0-5 |
| $Na_2O + K_2O$ | 12-20 | $TiO_2$ | 0-5 | $B_2O_3$ | 0-2 |
| ZnO | 0-15 | ZnO + MgO + $TiO_2$ | 10-20 | Other Alkali Metal Oxides. | 0-5 |

$Fe_2O_3$, CoO, and NiO in unspecified amounts are mentioned as possible colorants that may be added. $B_2O_3$ is an optional component that may be included in concentrations less than are required in the present inventive glasses. Although not asserted to be a necessary constituent, ZnO appears in all of the examples supplied in the patent.

U.S. Pat. No. 4,565,791 (Boudot et al.) is drawn to ophthalmic glasses consisting essentially, in weight percent, of

| $SiO_2$ | 54-70 | $Li_2O$ | 0.5-3 | $As_2O_3$ | 0-2 |
|---|---|---|---|---|---|
| $B_2O_3$ | 9-22 | $Na_2O$ | 3-9 | $ZrO_2$ | 0.1-0.5 |
| $Al_2O_3$ | 3-10 | $K_2O$ | 3-10 | Cl | 0.2-0.7 |
| $TiO_2$ | 4-6 | $Li_2O + Na_2O + K_2O$ | 10-13. | | |

The $Al_2O_3$ and $B_2O_3$ levels substantially exceed the maximum permitted in the present inventive glasses. Because of a yellow coloration developing from a reaction which can take place between iron and titanium, iron will preferably be absent from the composition.

U.S. Pat. No. 4,768,859 (Kasori et al.) claims composition for cladding glasses for optical fibers consisting essentially, in weight percent, of

| $SiO_2$ | 60-80 | Alkaline Earth Metal Oxides | 0-8 |
|---|---|---|---|
| $B_2O_3$ | 7-12 | ZnO | 0-7 |
| $Al_2O_3$ | 4-7 | $ZrO_2$ | 0-7 |
| $Li_2O$ | 2-4 | $TiO_2$ | 0-7 |
| $Na_2O$ | 6-8 | $ZnO + ZrO_2 + TiO_2$ | >0-7 |
| $K_2O$ | 3.5-6 | F | >0-3 |
| $Li_2O + Na_2O + K_2O$ | 9-17. | | |

The $B_2O_3$ and $Al_2O_3$ contents are higher and the $K_2O$ concentration is lower than are required in the present inventive glasses. Fluoride is not a mandated constituent in the present inventive glasses and the preferred compositions appear to contain either CaO and ZnO.

U.S. Pat. No. 4,824,806 (Yokoi et al.) is directed to compositions for glass fibers consisting essentially, in weight percent, of

| $SiO_2$ | 45-65 | $Li_2O + Na_2O + K_2O$ | 0-5 |
|---|---|---|---|

-continued

| | | | | |
|---|---|---|---|---|
| B$_2$O$_3$ | 13-30 | MgO + CaO + ZnO | 4-10 | |
| Al$_2$O$_3$ | 9-20. | | | |

The total alkali metal oxide level is far less than the minimum demanded in the instant inventive glasses and the B$_2$O$_3$ and Al$_2$O$_3$ concentrations much higher than the maximum permitted of those oxides in the present inventive glasses. Moreover, all of the working examples recited in the patent contained CaO, with several containing ZnO, also.

DESCRIPTION OF PREFERRED EMBODIMENT

Table I lists glass compositions 1-9, expressed in terms of parts by weight on the oxide basis, illustrating the present invention. Because the sum of the individual constituents very closely approximates 100, however, for all practical purposes the tabulated values may be considered to reflect weight percent. The actual batch ingredients can consist of any materials, either oxides or other compounds, which, when melted together, will be converted into the desired oxide in the proper proportions. To illustrate, Na$_2$CO$_3$ and K$_2$CO$_3$ can comprise the source of Na$_2$O and K$_2$O, respectively. Table IA records the same glass compositions but expressed in terms of cation percent on the oxide basis.

The batch ingredients were compounded, ballmilled together to aid in obtaining a homogeneous melt, and then charged into platinum crucibles. The crucibles were introduced into a furnace operating at about 1450° C., the batches melted for about four hours, the melts poured into steel molds to yield rectangular glass slabs, and those slabs transferred immediately to an annealer operating at about 510° C.

Test samples were cut from the slabs and measurements of chromaticity and transmittance at a wavelength of 380 nm were carried out on ground and polished plates of 2.0 mm cross section.

The above description of glass making reflects laboratory melting and forming practice only. It will be appreciated that glass compositions complying with the parameters of the present invention can be melted and formed in much larger amounts employing conventional commercial glass melting units and glass forming equipment and techniques. Thus, it is only necessary that glass forming batches of the required formulations be prepared, those batches fired at a temperature and for a time sufficient to secure homogeneous melts, and those melts then cooled and shaped into articles of desired configurations.

As illustrative thereof, Examples 10, 11, and 12 record three glass compositions produced in a large scale glass melting unit. Pressed lenses were formed and annealed, and test samples cut therefrom. Table I reports the compositions thereof in parts by weight on the oxide basis and Table IA recites the compositions in cation percent on the oxide basis.

TABLE I

| | 1 | 2 | 3 | 4 | 5 | 6 |
|---|---|---|---|---|---|---|
| SiO$_2$ | 67.8 | 67.6 | 67.5 | 67.0 | 67.5 | 68.6 |
| B$_2$O$_3$ | 4.13 | 4.12 | 4.16 | 4.15 | 4.17 | 4.15 |
| Al$_2$O$_3$ | — | — | 1.14 | 0.76 | 0.763 | 0.57 |
| Na$_2$O | 6.68 | 6.66 | 6.71 | 6.7 | 6.72 | 6.7 |
| K$_2$O | 14.4 | 14.4 | 14.5 | 14.5 | 14.5 | 14.5 |
| CaO | 1.16 | 1.15 | 0.52 | 1.05 | 1.05 | — |
| As$_2$O$_3$ | 0.2 | 0.02 | 0.18 | 0.184 | 0.185 | 0.184 |
| Fe$_2$O$_3$ | 4.96 | 5.2 | 5.07 | 5.45 | 4.81 | 5.06 |

TABLE I-continued

| | | | | | | |
|---|---|---|---|---|---|---|
| Co$_3$O$_4$ | 0.013 | 0.0126 | 0.0135 | 0.013 | 0.0117 | 0.0135 |
| NiO | 0.189 | 0.188 | 0.188 | 0.194 | 0.175 | 0.188 |
| K$_2$O:Na$_2$O | 2.16 | 2.16 | 2.16 | 2.16 | 2.16 | 2.16 |

| | 7 | 8 | 9 | 10 | 11 | 12 |
|---|---|---|---|---|---|---|
| SiO$_2$ | 67.6 | 69.2 | 65.6 | 69.09 | 67.4 | 69.1 |
| B$_2$O$_3$ | 4.15 | 4.15 | 5.51 | 4.10 | 4.13 | 4.1 |
| Al$_2$O$_3$ | 0.57 | — | 1.92 | — | 0.608 | — |
| Na$_2$O | 6.7 | 6.69 | 6.78 | 8.4 | 6.75 | 8.4 |
| K$_2$O | 14.5 | 14.5 | 14.7 | 11.7 | 14.7 | 11.7 |
| CaO | 1.05 | — | — | 0.8 | 0.501 | 0.8 |
| As$_2$O$_3$ | 0.184 | 0.184 | 0.187 | 0.2 | 0.203 | 0.204 |
| Fe$_2$O$_3$ | 5.06 | 5.005 | 5.12 | 5.5 | 5.55 | 5.5 |
| Co$_3$O$_4$ | 0.0135 | 0.0134 | 0.0136 | 0.0175 | 0.0164 | 0.0151 |
| NiO | 0.188 | 0.188 | 0.19 | 0.188 | 0.189 | 0.188 |
| K$_2$O:Na$_2$O | 2.16 | 2.16 | 2.17 | 1.4 | 2.18 | 1.39 |

TABLE IA

| | 1 | 2 | 3 | 4 | 5 | 6 |
|---|---|---|---|---|---|---|
| SiO$_2$ | 60.7 | 60.7 | 60.2 | 59.8 | 60.1 | 61.3 |
| B$_2$O$_3$ | 6.39 | 6.39 | 6.4 | 6.4 | 6.4 | 6.4 |
| Al$_2$O$_3$ | — | — | 1.2 | 0.8 | 0.8 | 0.6 |
| Na$_2$O | 11.6 | 11.6 | 11.6 | 11.6 | 11.6 | 11.6 |
| K$_2$O | 16.5 | 16.4 | 16.5 | 16.5 | 16.5 | 16.5 |
| CaO | 1.11 | 1.11 | 0.5 | 1.0 | 1.0 | — |
| As$_2$O$_3$ | 0.11 | 0.11 | 0.1 | 0.1 | 0.1 | 0.1 |
| Fe$_2$O$_3$ | 3.34 | 3.51 | 3.4 | 3.66 | 3.22 | 3.4 |
| Co$_3$O$_4$ | 0.009 | 0.0085 | 0.009 | 0.0087 | 0.0078 | 0.009 |
| NiO | 0.136 | 0.136 | 0.135 | 0.139 | 0.125 | 0.135 |

| | 7 | 8 | 9 | 10 | 11 | 12 |
|---|---|---|---|---|---|---|
| SiO$_2$ | 60.3 | 61.9 | 57.9 | 61.32 | 60.2 | 61.3 |
| B$_2$O$_3$ | 6.4 | 6.4 | 8.4 | 6.28 | 6.37 | 6.28 |
| Al$_2$O$_3$ | 0.6 | — | 2.0 | — | 0.64 | — |
| Na$_2$O | 11.6 | 11.6 | 11.6 | 14.45 | 11.7 | 14.4 |
| K$_2$O | 16.5 | 16.5 | 16.5 | 13.24 | 16.7 | 13.2 |
| CaO | 1.0 | — | — | 0.76 | 0.48 | 0.76 |
| As$_2$O$_3$ | 0.1 | 0.1 | 0.1 | 0.107 | 0.11 | 0.11 |
| Fe$_2$O$_3$ | 3.4 | 3.4 | 3.4 | 3.67 | 3.73 | 3.67 |
| Co$_3$O$_4$ | 0.009 | 0.009 | 0.009 | 0.0116 | 0.011 | 0.01 |
| NiO | 0.135 | 0.135 | 0.135 | 0.134 | 0.136 | 0.134 |

Table II lists percent transmittance (Trans) at a wavelength of 380 nm at a thickness of 2 mm, and chromaticity values (Y,x,y) at a thickness of 2 mm, as determined employing techniques conventional in the glass art. Code 8015 and Code 8364 are included for comparison purposes.

TABLE II

| | 1 | 2 | 3 | 4 | 5 | 6 | 7 |
|---|---|---|---|---|---|---|---|
| Trans | 1.0 | 0.8 | 0.9 | 0.51 | 0.98 | 1.57 | 0.49 |
| Y | 14.4 | 15.0 | 13.6 | 10.6 | 12.4 | 14.2 | 14.5 |
| x | 0.3106 | 0.3152 | 0.3091 | 0.3152 | 0.3062 | 0.3034 | 0.3238 |
| y | 0.3240 | 0.3316 | 0.3192 | 0.3381 | 0.3287 | 0.3112 | 0.3432 |

| | 8 | 9 | 10 | 11 | 12 | 8015 | 8364 |
|---|---|---|---|---|---|---|---|
| Trans | 2.62 | 0.7 | 0.8 | 0.81 | 0.86 | 1.1 | 19.9 |
| Y | 13.3 | 11.4 | 14.4 | 15.3 | 14.1 | 19.0 | 19.6 |
| x | 0.2969 | 0.3078 | 0.3114 | 0.3116 | 0.3130 | 0.3108 | 0.3250 |
| y | 0.3070 | 0.3208 | 0.3303 | 0.3251 | 0.3333 | 0.3414 | 0.3350 |

The appended drawing depicts the "color box" of chromaticity coordinates (x,y), as determined utilizing a conventional tristimulus colorimeter with Illuminate C within which the desired neutral gray, fixed tint coloration of the inventive resides. That is, the desired tint is encompassed within the neutral gray target area of the polygon having Apices A, B, C, and D, wherein Apex C is Illuminat C. Apices A, B, C, and D designate the following x, y coordinates:

|   | x | y |
|---|---|---|
| A | 0.3100 | 0.3170 |
| B | 0.3170 | 0.3283 |
| C | 0.311 | 0.3345 |
| D | 0.304 | 0.3207 |

As is immediately evident from an examination of the measurements recorded in Table II and as graphically represented in the appended drawing, the compositions of the inventive glasses are extremely critical in yielding products exhibiting chromaticities encompassed within the area of the polygon bounded by Apices A, B, C, and D as well as transmittances at a wavelength of 380 nm of no more than 1%. To illustrate:

Examples 4 and 5 demonstrate the effect of iron on chromaticity and radiation absorption at 380 nm. It can be seen that the absorption at 380 nm increases at about the same amount as the iron concentration in terms of optical density. The luminous transmittance of Example 4 is about at the lower limit acceptable for sunglasses (arbitrarily fixed at a minimum Y of 10 and a maximum Y at 16). Furthermore, the purity of the glass is higher than acceptable for the neutral sunglass desired in this invention; the maximum being arbitrarily fixed at 6, preferably no higher than 5. Nevertheless, the iron content is not restricted to the level of Example 4 as can be observed in Example 12, which glass plots well within the chromaticity diagram with a higher iron concentration.

That aluminum, calcium, and/or boron suppress the transmittance of the glass at 380 nm is demonstrated in a study of Tables I and II. Examples 6 and 8 are identical except that in Example 6 0.57% $Al_2O_3$ has replaced that amount of $SiO_2$. That incorporation of $Al_2O_3$ reduced the transmittance of the glass at 380 nm from 2.62% (Example 6) to 1.57% (Example 8). The chromaticity diagram shows the color of the glass shifting toward the illuminant, i.e., becoming less blue.

Examples 6 and 7 illustrate the effect of calcium on the transmittance of the glass at a wavelength of 380 nm. In addition to the 0.57% $Al_2O_3$ included in Example 6, Example 7 has 1.05% CaO substituted for that amount of $SiO_2$. That latter addition reduced the transmittance of the glass at 380 nm from 1.57% to 0.49%. As can be seen in the chromaticity diagram, the addition of CaO imparts a very strong effect, the observed shift being in the same general direction as increases in iron content. Also, in like manner to the introduction of $Al_2O_3$ in Example 6, the inclusion of CaO causes a slight increase in luminous transmittance.

Example 9 contains $Al_2O_3$ and $B_2O_3$ in greater amounts than Example 6. The transmittance of the glass decreased from 1.57% to 0.70%. As illustrated in the chromaticity diagram, in like manner to increasing the iron content, the color moves away from blue. Contrary to Examples 6, 7, and 8, however, the luminous transmittance of Example 9 decreased.

The effect of the $K_2O:Na_2O$ ratio on the chromaticity of the glass is evidenced through a comparison of Example 11 with Example 12. Thus, that ratio changes from 2.18 in Example 11 to 1.39 in Example 12. With only very minor changes in the colorant package ($Co_3O_4$+NiO), the chromaticity of the glass can be seen to shift in the same direction as occurs with increasing the iron content.

That the composition intervals of the present must be strictly observed and the colorant additions carefully adjusted to produce glasses exhibiting the desired ultraviolet radiation absorption, chromaticity, luminous transmittance, and purity is evident from the observation that Examples 2, 4-8, and 12, although having compositions close to those of Examples 1, 3, 9, 10, and 11, are outside the desired chromaticity values and/or exhibit excessive purity and/or demonstrate excessive transmittance at 380 nm. Code 8015 and Code 8364 are also outside of the chromaticity diagram.

Example 11 is our most preferred embodiment.

We claim:

1. A transparent glass which, at a thickness of 2 mm, does not transmit more than about 1% of ultraviolet radiation at a wavelength of 380 nm and exhibits a neutral gray, fixed tint bounded by apices A, B, C, D, A of the drawing, a purity no higher than 6, and a luminous transmittance between 10-16, said glass having a composition consisting essentially, expressed in terms of weight percent on the oxide basis, of

| $SiO_2$ | 65-72 | CaO | 0-1.5 |
|---|---|---|---|
| $B_2O_3$ | 2-6 | $Al_2O_3$ + CaO | 0.2-2.25 |
| $Na_2O$ | 6-10 | $As_2O_3$ | 0-0.3 |
| $K_2O$ | 10-16 | $Fe_2O_3$ | 4.8-6.2 |
| $Na_2O$ + $K_2O$ | 17-23 | $Co_3O_4$ | 0.012-0.02 |
| $K_2O:Na_2O$ | 1.25-2.25 | NiO | 0.16-0.21 |
| $Al_2O_3$ | 0-2.25 | ZnO | 0-1.5. |

2. A transparent glass according to claim 1 also containing up to 5% total of at least one member selected from the group consisting of 0-3% BaO, 0-3% MgO, 0-3% $TiO_2$, and 0-3% $ZrO_2$.

3. A transparent glass according to claim 1 essentially free from CaO and ZnO and containing 0.2-2.25% $Al_2O_3$.

* * * * *